(12) United States Patent
Kemp et al.

(10) Patent No.: US 8,345,240 B2
(45) Date of Patent: *Jan. 1, 2013

(54) ROTATION DETECTION KIT

(75) Inventors: Christopher Kemp, Wotton-under-Edge (GB); Stephen Mark Angood, Witney (GB)

(73) Assignee: Renishaw PLC, Wotton-under-Edge (GB)

( * ) Notice: Subject to any disclaimer, the term of this patent is extended or adjusted under 35 U.S.C. 154(b) by 333 days.

This patent is subject to a terminal disclaimer.

(21) Appl. No.: 12/450,737

(22) PCT Filed: Apr. 9, 2008

(86) PCT No.: PCT/GB2008/001269
§ 371 (c)(1),
(2), (4) Date: Oct. 9, 2009

(87) PCT Pub. No.: WO2008/122816
PCT Pub. Date: Oct. 16, 2008

(65) Prior Publication Data
US 2010/0097606 A1    Apr. 22, 2010

(30) Foreign Application Priority Data
Apr. 10, 2007  (GB) .................................. 0706821.6

(51) Int. Cl.
*G01J 4/00* (2006.01)
(52) U.S. Cl. ...................................................... 356/367
(58) Field of Classification Search .................. 356/364, 356/367
See application file for complete search history.

(56) References Cited

U.S. PATENT DOCUMENTS

| | | | |
|---|---|---|---|
| 3,306,159 A | 2/1967 | Beall, Jr. et al. | |
| 3,336,832 A | 8/1967 | Snavely | |
| 3,474,255 A | 10/1969 | White | |
| 3,552,859 A | 1/1971 | Snyder, III | |
| 3,604,811 A | 9/1971 | McMenmin | |
| 3,723,013 A | 3/1973 | Stirland et al. | |
| 3,871,771 A | 3/1975 | Scott | |
| 3,932,039 A | 1/1976 | Frey | |
| 3,938,890 A | 2/1976 | Flavell | |
| 4,695,796 A | 9/1987 | Omet et al. | |
| 4,792,228 A * | 12/1988 | Haffner ........................ | 356/138 |

(Continued)

FOREIGN PATENT DOCUMENTS

DE    34 05 886 A1    8/1985

(Continued)

OTHER PUBLICATIONS

Jiang, H. et al., "Sensitivity enhanced roll angle measurement," *Optical Engineering*, vol. 39, No. 2, pp. 516-519, Feb. 2000.

(Continued)

*Primary Examiner* — Roy M Punnoose
(74) *Attorney, Agent, or Firm* — Oliff & Berridge, PLC

(57) ABSTRACT

A rotation detection kit, comprising a source for generating at least a first polarized beam emitted along a propagation axis, a receiver comprising at least a first beam intensity sensor and an analyzer. The analyzer comprises a first polarizer device for location in the at least first polarized beam between the source and at least first beam intensity sensor. The first polarizer device is configured such that the receiver can measure rotation between the source and the analyzer about a first axis that is non-parallel to the propagation axis based on the at least first beam intensity sensor's output.

14 Claims, 6 Drawing Sheets

U.S. PATENT DOCUMENTS

| | | | |
|---|---|---|---|
| 4,863,274 | A | 9/1989 | Spillman, Jr. et al. |
| 4,958,929 | A | 9/1990 | Kondo |
| 5,021,647 | A | 6/1991 | Tatsuno et al. |
| 5,073,025 | A * | 12/1991 | Brooks ............... 356/367 |
| 5,102,222 | A | 4/1992 | Berger et al. |
| 5,333,053 | A | 7/1994 | Ishida |
| 5,408,318 | A | 4/1995 | Slater |
| 5,596,403 | A | 1/1997 | Schiff et al. |
| 5,815,269 | A | 9/1998 | Crabb et al. |
| 5,900,938 | A * | 5/1999 | Huang ................ 356/508 |
| 6,031,613 | A | 2/2000 | Washington |
| 6,049,377 | A | 4/2000 | Lau et al. |
| 7,027,162 | B2 | 4/2006 | Lau et al. |
| 7,230,689 | B2 * | 6/2007 | Lau ..................... 356/73 |
| 7,352,446 | B2 | 4/2008 | Bridges et al. |
| 2003/0043362 | A1 | 3/2003 | Lau |
| 2003/0106228 | A1 | 6/2003 | Fujishima |
| 2004/0200947 | A1 | 10/2004 | Lau |
| 2007/0057668 | A1 | 3/2007 | Lee et al. |

FOREIGN PATENT DOCUMENTS

| | | |
|---|---|---|
| DE | 38 03 853 A1 | 8/1989 |
| EP | 0 345 093 A2 | 12/1989 |
| EP | 0 468 487 A2 | 1/1992 |
| EP | 0 936 445 B1 | 7/2006 |
| GB | 1 428 372 | 3/1976 |
| GB | 1 453 728 | 10/1976 |
| GB | 2 389 896 A | 12/2003 |
| JP | A-2003-156319 | 5/2003 |
| WO | WO 92/21933 | 12/1992 |
| WO | WO 98/07012 | 2/1998 |
| WO | WO 02/04890 A1 | 1/2002 |
| WO | WO 03/019231 A1 | 3/2003 |
| WO | WO 03/083411 A1 | 10/2003 |
| WO | WO 2004/102225 A2 | 11/2004 |
| WO | WO 2008/122808 A2 | 10/2008 |
| WO | WO 2008/122814 A2 | 10/2008 |

OTHER PUBLICATIONS

Ingensand, H. et al., "A High-Accuracy Alignment System Based on the Dispersion Effect," Proceedings of the 5$^{th}$ International Workshop on Accelerator Alignment, Oct. 13-17, 1997.

Ingensand, H., "Concepts and Solutions to Overcome the Refraction Problem in Terrestrial Precision Measurement," Session JS28 Integration of Techniques and Corrections to Achieve Accurate Engineering Survey; FIG XXII International Congress, Washington, D.C USA, Apr. 19-26, 2002.

Ikeda, K. et al., "Endless Tracking Polarization Controller," *Furukawa Review*, No. 23, pp. 32-38, 2003.

* cited by examiner

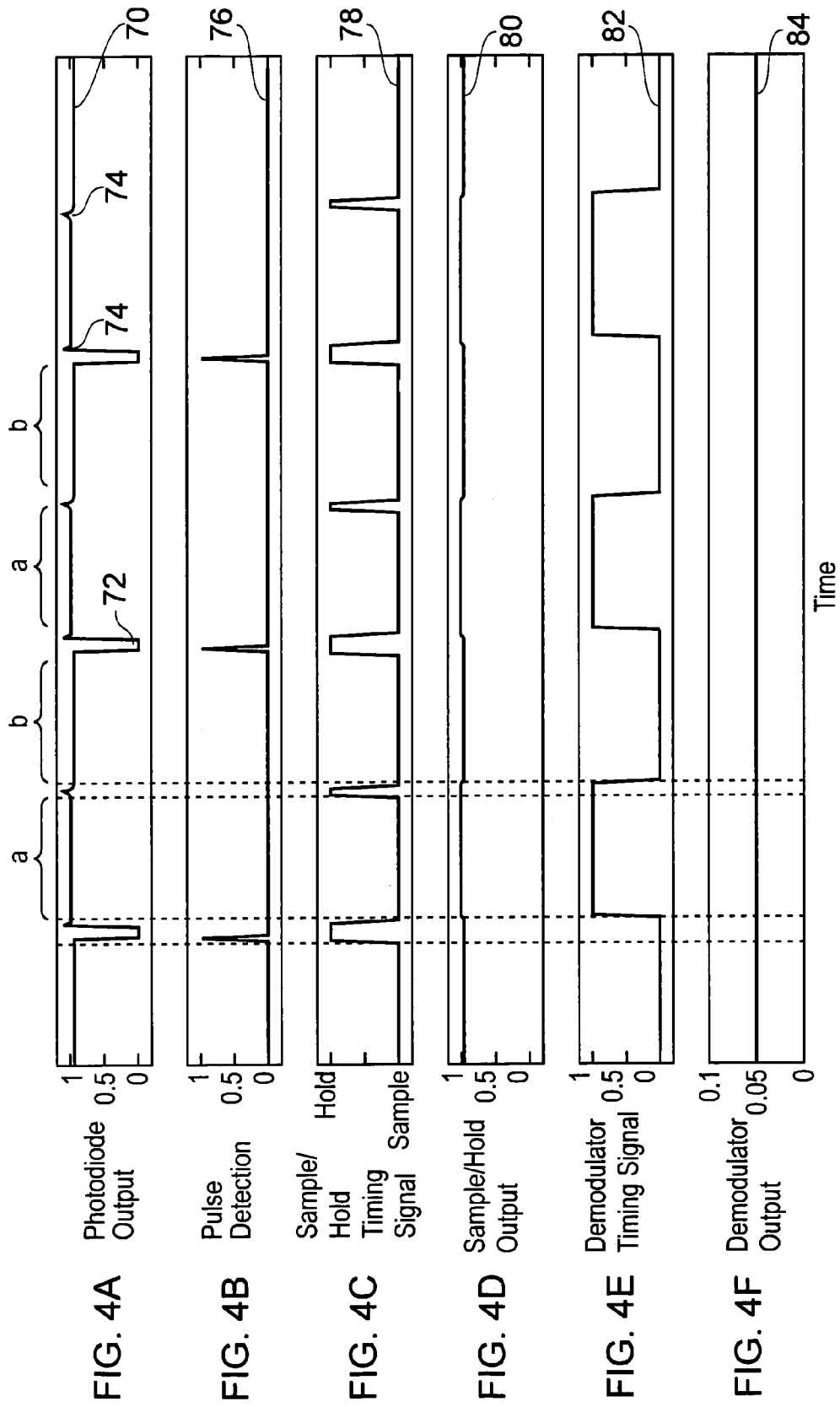

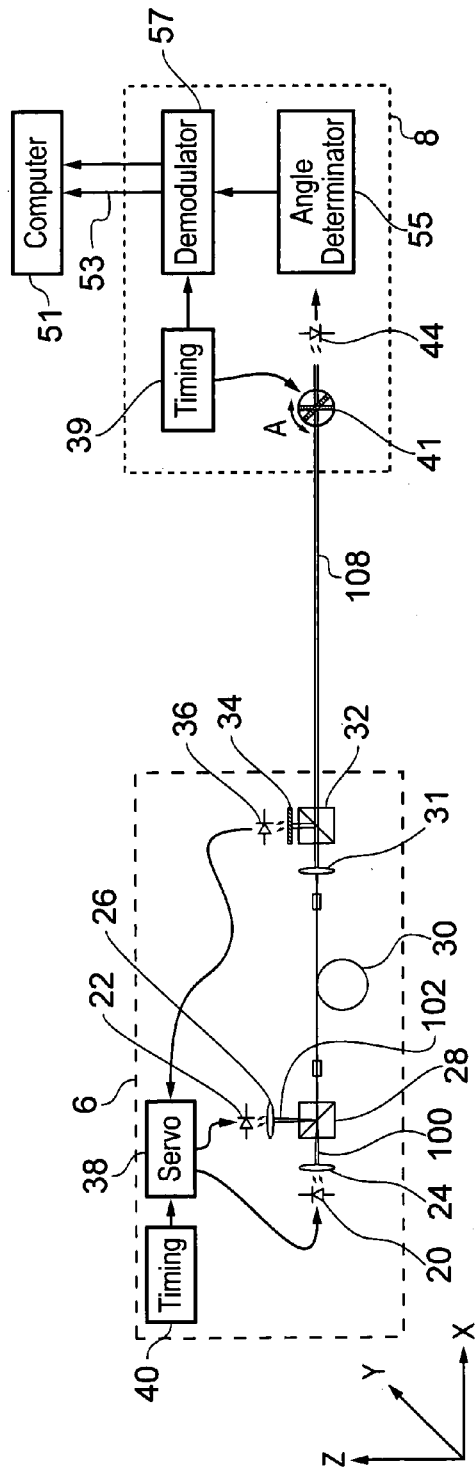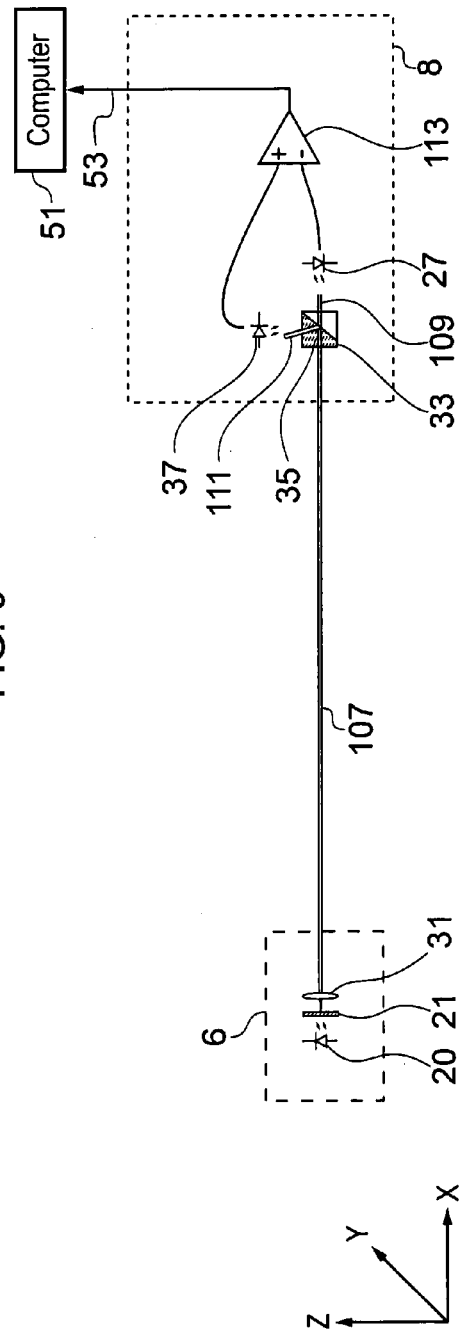
FIG. 9
FIG. 10

ROTATION DETECTION KIT

This invention relates to a rotation detection kit, and in particular to rotation detection kits that enable rotational movement other than roll between two components to be measured.

Rotation detection kits enable relative rotation between two components to be detected. This is useful when it is necessary to know that two components have rotated relative to each other so that subsequent action can be taken. Rotation detection kits which enable the degree of rotation to be measured are useful when it is necessary to know by how much the components have rotated relative to each other. For example, such a rotation detection kit would be useful in determining the degree of rotation of a moving machine component relative to stationary machine component as the moving machine component travels along a trajectory. This enables the machine to be calibrated. In particular, such a rotation detection apparatus could be used to calibrate a co-ordinate positioning apparatus such as a co-ordinate measuring machine (CMM), a machine tool, or a rotating/tilting stage.

Rotation detection kits could also be useful in tracking systems, such as systems for accurately tracking the movement of a robot arm, or for instance tracking the movement of a tool mounted on the quill of a CMM.

The present invention relates to improvements in rotation detection kits.

It is known to measure roll between two objects using a polarised beam. A first object emits a polarised beam, a second object has a polariser device and a beam intensity sensor which are arranged such that as the first and second object roll relative to each other about the propagation axis the intensity of the beam falling on the beam intensity sensor changes. The pitch and yaw between the two objects are measured using a different system and typically by using lenses to focus beams emitted from the first object onto position sensors provided by the second object.

Alternatively, pitching and yawing of one of the objects could effectively be measured using second and third roll detection systems which project their beam along second and third mutually perpendicular axes respectively such that roll about those axes can be measured. However, as will be appreciated, in this case, there are effectively three systems working independently, each measuring roll, that is rotation about the propagation axis of the beam.

According to a first aspect of the invention, there is provided a rotation detection kit, comprising: a source for generating at least a first polarised beam emitted along a propagation axis; a receiver comprising at least a first beam intensity sensor; an analyser comprising a first polariser device for location in the at least first polarised beam between the source and at least first beam intensity sensor, in which the polariser device is configured such that the receiver measures rotation between the source and the analyser about a first axis that is non-parallel to the propagation axis based on the at least first beam intensity sensor's output.

The present invention allows rotational movement other than roll (i.e. rotational measurements about an axis other than the propagation axis) to be detected by looking at the intensity of a beam emitted from the source as detected by the beam intensity sensor. This is due to the intensity of the beam subsequent to the polariser device being dependent on the relative rotational position of the polariser device and source about the first axis. Furthermore, it has been found that with such a configured polariser device, relative rotation between the source and analyser device about an axis that is perpendicular to the propagation axis affects the intensity of the polarised beam whose path it is in. Accordingly, the present invention can be used to measure relative rotation between the source and analyser about an axis that extends perpendicular to the propagation axis.

As will be understood, the propagation axis can be the axis along which the at least first polarised beam travels from the source toward the analyser. In embodiments in which the analyser and source are moveable relative to each other in a linear dimension, this can be the direction in which they are linearly moveable.

The source can be a beam source. Preferably the source is a polarised beam source.

The measurement of rotation about the first axis can be used to obtain information on the rotational measurement about an axis that is different to the first axis. In particular, the measurement of rotation about the first axis can be used to obtain information on the measurement about an axis that is perpendicular to the propagation axis. For instance, if the source and analyser are constrained from rolling relative to each other, then it can be assumed that any measure of rotation is due to relative rotation about an axis that extends perpendicularly to the propagation axis. Accordingly, the receiver can be configured to determine rotational movement between the source and analyser about an axis that is substantially perpendicular to the propagation axis based on the determined relative rotation about the first axis. The receiver can be configured to provide an output which is indicative of rotational movement between the source and analyser about an axis that is non-parallel to the propagation axis. For instance, the receiver can be configured to provide an output which is indicative of rotational movement between the source and analyser about an axis which is substantially perpendicular to the propagation axis.

Preferably, the polariser device is configured such that the receiver measures rotation between the source and the analyser about a first axis that is substantially non-parallel to the propagation axis based on the at least first beam intensity sensor's output. Preferably, the angle between the propagation axis and the first axis is at least 15°, more preferably at least 45°. As will be understood, the greater the angle the more the intensity of the at least first polarisation beam subsequent to the first polariser device will be affected by rotation about an axis perpendicular to the propagation axis. Accordingly, the greater the angle the more effective the polariser device is to measuring pitch or yaw, that is rotation about an axis perpendicular to the propagation axis. However, as will be understood, depending on the polariser device used, the closer that the angle between the propagation axis and first axis gets to being 90°, the more problems might be experienced with the at least first polarised beam passing through the polariser device. Accordingly, it can be preferred that the angle between the propagation axis and the first axis is not more than 85°, more preferably not more than 80°.

As will be understood, how the polariser device is configured such that the receiver can measure rotation between the source and the analyser about an axis that is non-parallel to the propagation axis depends on the type of polariser device used.

Suitable polariser devices include absorptive polarisers (e.g. fine wire grid or dichroic), and beam-splitting polarisers, (e.g. birefringent crystal polarisers, thin film polarisers and reflective polarisers).

In general, polariser devices can be characterised by a polarisation axis. For planar devices (such as fine wire, dichroic material, thin film) this is an axis within the plane of the device. For crystal optics, this is the crystal's optic axis and typically this is oriented to be in the plane of the input window. In known systems which are configured to measure rotation about the propagation axis the polarisation axis is configured such that the polarisation axis is normal to the propagation axis.

Preferably, the first polariser device is configured such that its polarisation axis is not perpendicular to the propagation axis. In particular, preferably, the acute angle between the first polariser device's polarisation axis and the propagation axis is not more than 80°, more preferably not more than 70°, especially preferably not more than 45°, and can be most preferably not more than 30°.

As will be understood, depending on the configuration of the analyser, the axis along which the at least first beam travels at the polariser device can be different to the propagation axis along which the at least first polarised beam travels from the source toward the analyser. Accordingly, the angle between the polarisation axis and the propagation axis can be taken as the angle between the polarisation axis and the axis along which the at least first beam will be travelling at the point the at least first beam is incident on the polariser device.

Sensors suitable for detecting the intensities of the first polarised beam and providing an output representative of the detected intensities, include photodetectors, such as photoresistors and photodiodes. The photodetectors need not necessarily be a single cell photodetector. For instance the photodetector could be a quad cell photodetector. This enables both beam intensity and position to be determined. The beam intensity sensor could also be any other sort of beam intensity and position sensor, e.g. such as an image sensor, for example a charge-coupled device (CCD) sensor or complementary metal-oxide-semiconductor (CMOS) sensor. This is advantageous because the output of the photodetector could also be used by the receiver to provide an output indicative of the position of the beam on the beam intensity and position sensor. This can be advantageous as it can provide an indication of any lateral misalignment between the source and analyser and/or receiver (in embodiments in which the receiver moves relative to the source). Accordingly, the receiver can be configured to provide an output based on the position of the beam on the beam intensity and position sensor. The output could be an output indicative of the lateral alignment of the source relative to the analyser and/or receiver (in embodiments in which the receiver moves relative to the source).

The source could emit a single beam only. The single beam could have a constant linear polarisation state. In this case, the receiver could comprise at least first and second beam intensity sensors for sensing the orthogonally resolved components of the beam as resolved by the polariser device. As the source and analyser rotate relative to each other, the intensity of one of the components will increase and the other will decrease. Accordingly, the amount and direction of rotation can be determined by comparing the relative intensities.

Optionally, the single beam could have a time varying polarisation state. This is advantageous as it enables the receiver to measure rotation about the first axis using only a single first beam intensity sensor. The receiver may still comprise a plurality of first beam intensity sensors, but the use of a single first beam intensity sensor can be advantageous as changes in the conditions of the sensor will not give a false indication of rotation as explained in more detail below.

The time varying polarisation state could be created by modulating the source or by modulating the polarised beam emitted by the source. For instance, the polarisation state could be rotating continuously at a constant rate. In this case, the intensity of light falling on the at least one photodiode will varying in a periodic manner; for instance the intensity of light falling on the at least one photodiode might vary sinusoidally. Rotation between the source and analyser will cause a shift in the phase of the intensity signal as detected by the beam intensity sensor. Accordingly, in this case rotation could be determined by looking at the relative phase between the intensity signal and a reference signal.

Optionally, the polarised beam could comprise a discretely varying polarisation orientation thereby defining first and at least second temporally spaced beam portions. Preferably, the receiver comprises a single first beam intensity sensor for detecting the intensity of each of the first and at least second beam portions after they have been resolved by the polariser device. When a single beam intensity sensor is used to detect each of the first and second beam portions, changes in the conditions of the sensor will not give a false indication of rotation. Any such changes will affect the detected intensities of all of the first and at least second temporally spaced beam portions in the same manner and to the same extent. The output of the receiver can be dependent on the relative detected intensities, and since relative rotation of the analyser and the source will affect the relative detected intensities, the output of the receiver can be used to determine that rotation has occurred between the source and analyser.

As will be understood, each of the first and the at least second temporally spaced beam portions will define a footprint which falls on the at least first beam intensity sensor. In embodiments in which the first and second portions fall on the same at least first beam intensity sensor, preferably, the rotation detection kit is configured such that the footprint of the first beam portion and the footprint of the at least second beam portion at least partially overlap each other. Preferably, the rotation detection kit is configured such that the footprint of the first beam portion and the footprint of the at least second beam portions on the sensor are co-aligned. Preferably, the rotation detection kit is configured such that the footprint of the first beam portion is identical to the footprint of the at least second beam portions. Preferably, the footprints are identical in at least one of shape, size and orientation. Most preferably the footprints are identical in at all of shape, size and orientation.

In embodiments in which the polarisation orientation varies discretely the polarisation orientation of a beam reaching the polariser will be such that the polarisation orientation is not uniformly varying, i.e. the polarisation orientation will not continuously rotate at a constant velocity. Rather, the polarisation orientation could, for example, oscillate. For instance, the polarisation orientation could oscillate back and forth through 270° or less, for instance 180° or less, for example through 90° or less. In this case the intensity of each of the first and at least second temporally spaced beam portion as detected by the beam intensity sensor will vary with time. The level of intensity of a beam portion as detected by the beam intensity sensor at any one given point in time will depend on the degree of rotation between the source and the analyser. Accordingly, the output from the receiver could be based on the comparison of at least a part of the intensity of the beam portions. For instance, the output from the receiver could be based on the intensity of the beam portions as detected by the receiver at the boundaries of the temporally spaced beam portions.

The polarisation orientation could alternate between predetermined polarisation states. For instance, the polarisation orientation could alternate between at least two polarisation states. In this case, the first beam portion will have a first polarisation state and the at least second beam portion will have second polarisation state that is different to the first polarisation state. The polarisation states could be substantially linear. In this case, preferably, the acute angle between planes that extend parallel to the first and second substantially linear polarisation states is at least 45 degrees, more preferably at least 75 degrees. In embodiments in which there is only two polarisation states, preferably the first and second linear polarisation states are orthogonal to each other. In general, a more accurate determination of the extent of rotation can be determined when there is a larger acute angle.

Depending on the method by which the first and at least second beam portions are generated, the polarisation states of the first and second beam portions could rotate slightly over the duration of their emission. Preferably, the polarisation states of each of the first and at least second temporally spaced beam portions rotate through not more than 25 degrees during their emission, more preferably through not more than 15 degrees, especially preferably through not more than 5 degrees, for example through not more than 1 degrees. Most preferably, the first and second polarisation states do not rotate.

Furthermore, the polarisation orientation could be continuously rotating but at a non-constant velocity (e.g. it might rotate quickly between prolonged periods of slowly rotating polarisation orientations). For example, the polarisation orientation could be held for prolonged periods at relative rotations of 0°, 90°, 180° and 270° and quickly rotated between those orientations. In this case, the output from the receiver could be based on the difference in the intensities of the orthogonal beams during the prolonged periods at which the polarisation orientation is held, much in the same way as the method described in more detail below.

Preferably, the receiver is configured to determine relative rotation between the source and the polariser device based on the difference between the detected relative intensities of each of the first and at least second temporally spaced beam portions. Preferably, the receiver is configured to determine the extent of relative rotation between the source and the polariser device based on the difference between the detected relative intensities of each of the first and at least second temporally spaced beam portions.

In particularly preferred embodiments, the rotation detection kit is be configured to measure rotation to an accuracy of 1 milliradian or less, more preferably 10 microradians or less, especially preferably less 5 microradians.

In embodiments in which the polarised beam comprises first and at least second temporally spaced beam portions, preferably the at least first and second temporally spaced beam portions have substantially identical profiles and at least an initial common propagation axis toward the analyser. The use of temporally spaced beam portions that have substantially identical profiles and at least an initial common propagation axis helps to ensure that the beam portions are exposed to identical conditions, such as the environment through which they travel and the footprint they form on the sensor, thereby reducing the number of non-rotation related reasons as to why there might be a difference in the detected intensities. Details of such a system are disclosed in co-pending PCT application, titled ROTATION DETECTION KIT, filed on the same day as this application, with agents reference 718/WO/0 and claiming priority from UK Patent Application no. 0706821.6, the entire content of which is incorporated into this specification by this reference.

Optionally, the source can be configured to emit a first beam having a first wavelength and first polarisation orientation and at least a second beam having a second wavelength and a second polarisation orientation that differ to the first wavelength and polarisation orientation. In this case, the beam intensity sensor will be configured to independently sense the intensities of the first beam and the at least second beam based on their wavelength. Furthermore, the receiver will be configured to provide an output based on the intensities of the first and second beams as detected by the at least one beam intensity sensor.

In this case, a suitable sensor is a device which can distinguish between the beams by way of their wavelength and converts a physical property of each of the beams falling on it into an electrical output signal for use by the receiver. Sensors suitable for detecting the intensities of the first and the at least second beams, and providing an output representative of the detected intensities, include wavelength selective photodiodes. As mentioned above, the beam intensity sensor could also be any other sort of beam intensity and position sensor, e.g. such as a colour image sensor, e.g. a colour CCD or colour CMOS.

As the first and second beams are of different wavelengths, their centre points will fall on the beam intensity and position sensor at slightly different places even when they have an initial common propagation axis due to beams of different wavelengths being diffracted as they travel through the air by different amounts. The difference in their position on the beam intensity and position sensor can be used to extrapolate back to a real lateral alignment measurement. This helps to avoid errors in such measurements caused by turbulence in the medium through which the beams propagate between the source and receiver. Accordingly, the receiver can be configured to obtain an extrapolated lateral alignment value from the position of the first and second beams on the beam intensity and position sensor. Techniques for performing such extrapolation are known and for example are described in U.S. Pat. No. 5,333,053 the entire content of which is incorporated into this specification by this reference. Further details of a system in which beams of different wavelengths are used to determine rotation and/or lateral alignment are also disclosed in co-pending PCT application, titled DISPLACEMENT DETECTION KIT, filed on the same day as this application, with agents reference 778/WO/0 and claiming priority from UK Patent Application no. 0706821.6, the entire content of which is incorporated into this specification by this reference.

The source can comprise a beam conditioner through which the at least first beam to be emitted by the source passes. This can help to ensure consistency in the shape and orientation of the beam emitted from the source. This can be useful in embodiments in which the source contains only a single beam emitter as well as embodiments in which there is more than one beam emitter. Preferably, the beam conditioner comprises a waveguide or equivalent. Preferably the waveguide is a single mode waveguide. Preferably, the beam conditioner comprises a fibre optic. Preferably the fibre optic is a single mode fibre optic. Preferably, the fibre optic is a polarising maintaining fibre optic. The fibre optic could be a hollow fibre optic or a non-hollow fibre optic.

The analyser can be provided as part of the receiver such that the analyser and receiver are manipulable as a single unit. The analyser, and hence the at least first polariser device, can be mounted to or within the receiver such that it cannot move relative to the receiver.

Optionally, the analyser, and hence at least first polariser device, can be provided as a separate component to the receiver. In this case, the receiver can be located anywhere with respect to the source and analyser so long as the at least first polarised beam can be directed to fall on the beam intensity sensor subsequent to the at least first polariser device. Optionally, the source and receiver can be provided as a source/receiver unit which is manipulable as a single unit. In this case it will be necessary to provide a reflector arrangement, and/or at least one retroreflector, so that the at least first polarised beam emitted by the source/receiver unit is reflected back toward the source/receiver unit subsequent to the at least first polariser device.

The source can have features which enable it to be mounted to a first component of a machine so that it cannot move relative to the first component. The analyser can have features which enable it to be mounted to a second component of a machine so that it cannot move relative to the second component. When the analyser is provided as part of the receiver, the receiver can have features which enable it to be mounted to the second component of the machine so that it cannot move relative to the second component. Such features could comprise a mount. The mount could comprise a first part which is fastened to a component of the machine, and a second part which is mounted to the part to be mounted, such as the source, analyser or receiver.

Optionally, the first and second parts have co-operating formations which ensure a repeatable mounting relative to the machine to be achieved in at least five degrees of freedom. For example, the source could have formations which enable it to be kinematically mounted to a component of the machine. The polariser device could also have formations which enable it to be kinematically mounted to a component of the machine. The receiver could also have formations which enable it to be kinematically mounted to a component of the machine.

Preferably, the analyser comprises a second polariser device for location in the at least first polarised beam between the source and at least first beam intensity sensor independently from the first polariser. Preferably the second polariser device is configured such that in use the receiver measures relative rotation between the source and analyser about a second axis that is different to the first axis. The second axis can be parallel to the propagation axis. Accordingly, in this case the second polariser device's polarisation axis is perpendicular to the propagation axis. Accordingly, the second polariser device can be configured to enable the receiver to measure the degree of roll between the source and the analyser.

The second axis could be not parallel to the propagation axis. In this case, preferably the second polariser device is arranged such that its polarisation axis is not contained within a plane containing the first polariser device's polarisation axis and the propagation axis. In particular, in this case preferably the first and second polariser devices are configured such that the intensity of the at least first polarised beam subsequent to the first polariser device is affected by rotation between the source and the analyser about a first perpendicular axis that is perpendicular to the propagation axis, and such that the intensity of the at least first polarised beam subsequent to the second polariser device is affected by rotation between the source and the analyser about a second perpendicular axis that is perpendicular to the propagation axis and different to the first perpendicular axis. Preferably, the second perpendicular axis is orthogonal to the first perpendicular axis. As with the first polariser device, the measurement of rotation about the second axis can be used to obtain information on the measurement about an axis that is different to the second axis. For instance, if the source and analyser device are constrained from rolling relative to each other, then it can be assumed that any measure of rotation is due to relative rotations about two axes that extend perpendicularly to the propagation axis.

As will be understood, as the second polariser device is for location in the at least first polarised beam between the source and at least first beam intensity sensor independently from the first polariser, the at least first polarised beam is exposed to either the first or the second polariser device, and not to both. This could be achieved for instance by alternately and mutually exclusively locating the first and second polariser devices into the path of the at least first polarised beam. Alternatively, this could be also achieved by splitting the at least first polarised beam into identical first and second beams which are then directed toward respective first and second polariser devices. Accordingly, the analyser could comprise a first beam splitter for splitting the at least first polarised beam into a first arm directed toward the first polariser device and a second arm identical to the first arm directed toward the second polariser device.

The at least first beam intensity sensor could be configured to alternately detect the intensity of the at least first polarised beam subsequent to the first and second polariser devices. Preferably, the receiver comprises a second beam intensity sensor. Preferably, the first beam intensity sensor is arranged to detect the intensity of the beam subsequent to the first polariser device and the second beam intensity sensor is arranged to detect the intensity of the beam subsequent to the second polariser device.

Preferably, the receiver is configured to determine rotational movement between the source and analyser about two orthogonal axes based on the determined relative rotation about the first and second axes. Preferably one of the orthogonal axes is perpendicular to the propagation axis. Accordingly, preferably the receiver is configured to determine the degree of one of what are commonly referred to as the pitch and yaw between the source and analyser.

Preferably, the analyser comprises a third polariser device for location in the at least first polarised beam between the source and at least first beam intensity sensor independently from the first and second polarisers. Preferably, the third polariser device is configured such that the receiver measures relative rotation between the source and analyser about a third axis that is different to the first and second axes.

As will be understood, as the third polariser device is for location in the at least first polarised beam between the source and at least first beam intensity sensor independently from the first and second polarisers, the at least first polarised beam is exposed to either the first, second or third polariser device, and not to more than one of them at any one time. This could be achieved for instance by alternately and mutually exclusively locating the first, second and third polariser devices into the path of the at least first polarised beam. Alternatively, this could be also achieved by splitting the at least first polarised beam into identical first, second and third beams which are then directed toward respective first, second and third polariser devices. Accordingly, the analyser could comprise first and second beam splitters for splitting the at least first polarised beam into a first arm directed toward the first polariser device, a second arm identical to the first arm directed toward the second polariser device, and a third arm identical to the first and second arms directed toward the third polariser device.

Preferably, the receiver is configured to determine rotational movement between the source and analyser about three orthogonal axes based on the determined relative rotation about the first, second and third axes. Preferably, one of the axes is parallel to the propagation axis. Accordingly, the other two axes will extend perpendicularly to the propagation axis and to each other. Therefore, preferably the receiver is configured to determine the degree of what are commonly referred to as the pitch and yaw between the source and analyser.

Preferably the receiver comprises a third beam intensity sensor. The first beam intensity sensor can be arranged to detect the intensity of the beam once it has been resolved by the first polariser device, the second beam intensity sensor can be arranged to detect the intensity of the beam once it has been resolved by the second polariser device, and the third beam intensity sensor can be arranged to detect the intensity of the beam once it has been resolved by the third polariser device.

According to a second aspect of the invention, there is provided a rotation detection kit, comprising: a source for generating at least a first polarised beam emitted along a propagation axis; a receiver comprising at least a first beam intensity sensor; an analyser, comprising a first polariser device for location in the at least first polarised beam between the source and at least first beam intensity sensor, in which the first polariser device is configured such that the receiver can measure rotation between the source and the analyser about a first axis, in which the angle between the propagation axis and the first axis is at least 15°.

According to a third aspect of the invention, there is provided a rotation detection kit, comprising: a source for generating at least a first polarised beam; a receiver comprising at least a first beam intensity sensor; an analyser, comprising a first and second polariser devices for independent location in the at least first polarised beam between the source and at least first beam intensity sensor, in which the first polariser device is configured such that the receiver can measure rotation between the source and the analyser about a first axis that is non-parallel to the propagation axis based on the at least first beam intensity sensor's output, and in which the second polariser device is configured such that the receiver can measure relative rotation between the source and analyser about a second axis that is different to the first axis.

As will be understood, the above described features in connection with the first aspect of the invention can also be used in combination with the second and third aspects of the invention.

Embodiments of the invention will now be described, by way of example only, and with reference to the accompanying drawings, in which.

Figure 3:
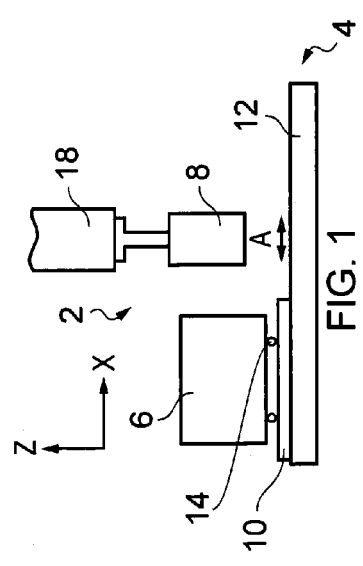
FIG. 3 shows a block circuit diagram of the roll, pitch/roll, yaw/roll determinators shown in FIG. 2.
Figure 2:
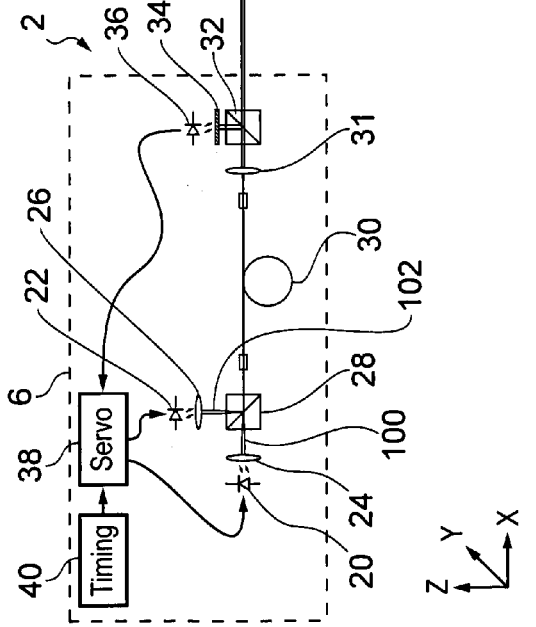
FIG. 2 shows a schematic diagram of the inside of the rotation detection kit shown in FIG. 1.
Figure 5A:
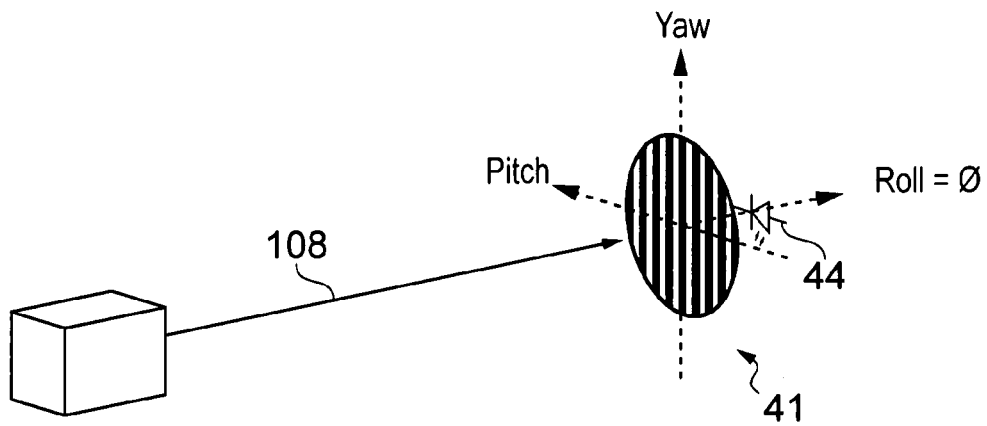
Figure 5B:
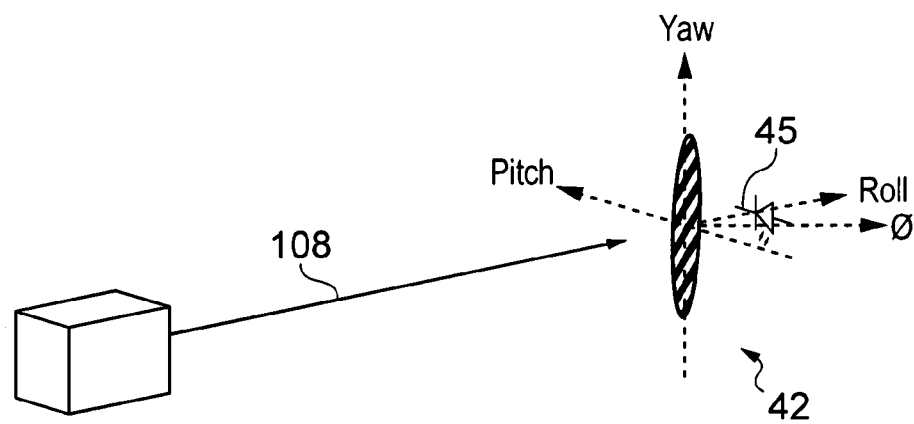
Figure 5C:
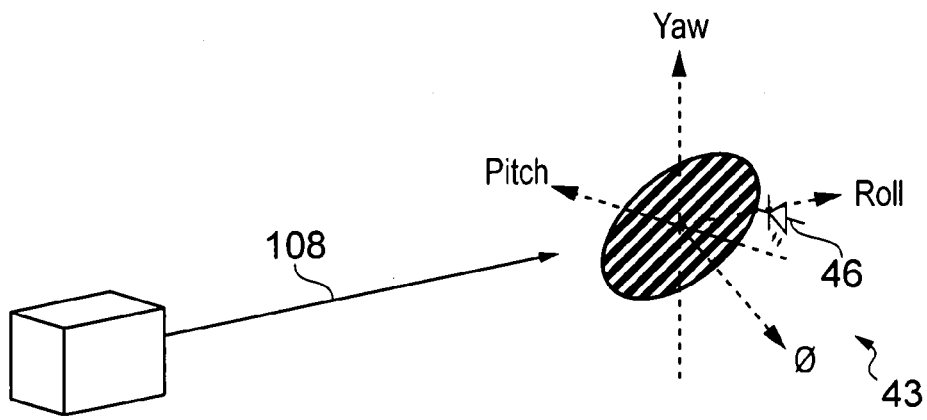
Figure 6:
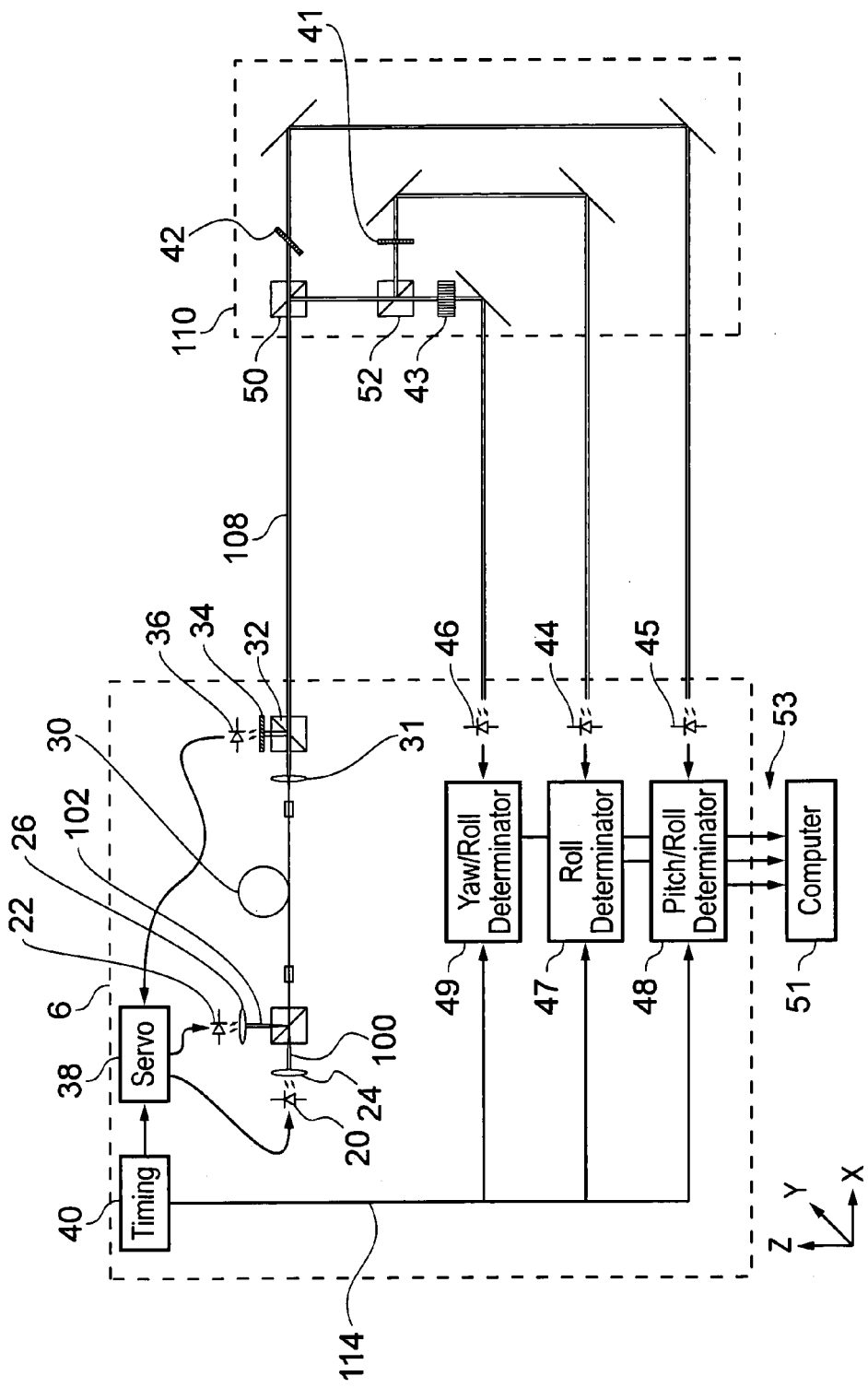
Figure 7:
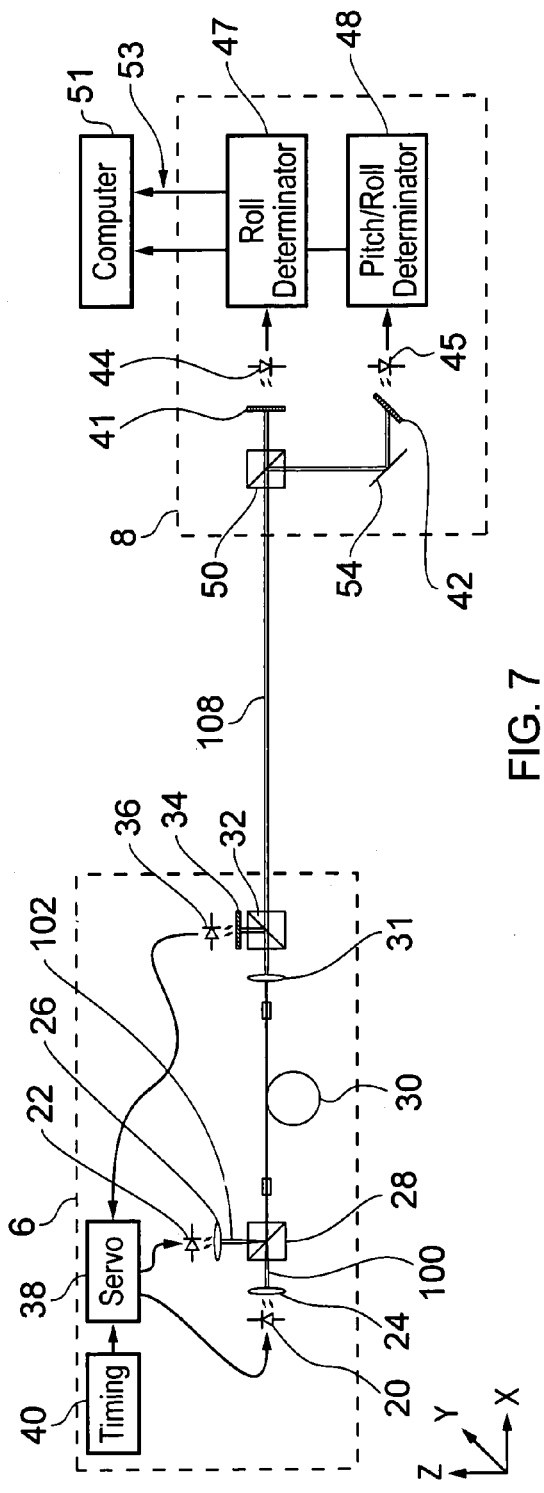
Figure 8:
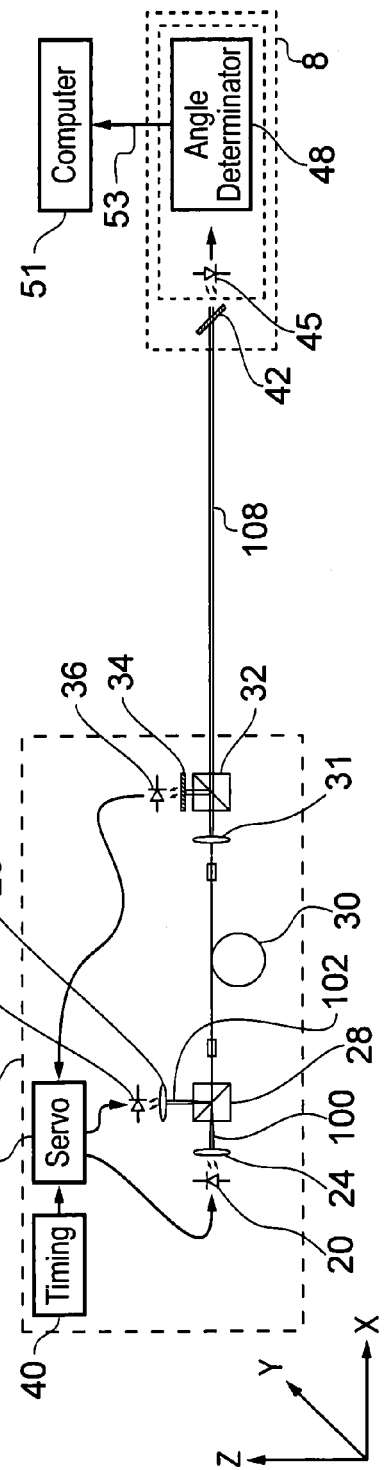

FIGS. 4(a) to (f) show example output signals for the photo-diode, pulse detector, timing generation unit, sample and hold unit and synchronous demodulator unit shown in FIG. 3;

FIG. 5(a) to (c) schematically illustrate the relative arrangement of the polarisers of FIG. 2;

FIG. 6 shows an alternative arrangement of the embodiment of the rotation detection kit shown in FIG. 2;

FIG. 7 shows a schematic diagram of a rotation detection kit according to a second embodiment of the invention;

FIG. 8 shows a schematic diagram of a rotation detection kit according to a third embodiment of the invention;

FIG. 9 shows a schematic diagram of a rotation detection kit according to a fourth embodiment of the invention; and FIG. 10 shows a schematic diagram of a rotation detection kit according to a fifth embodiment of the invention.

Figure 1:
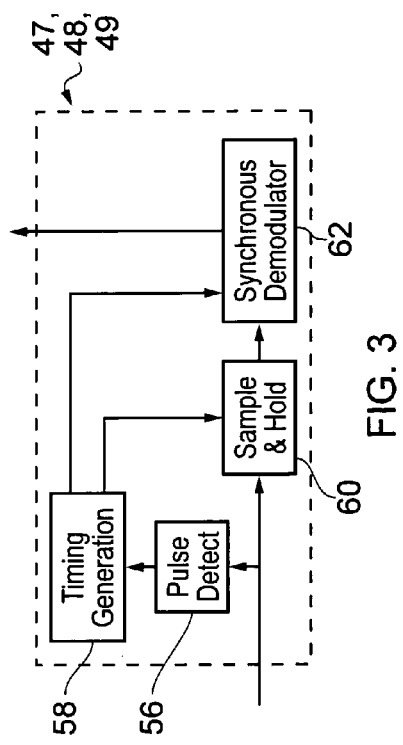
FIG. 1 shows a rotation detection kit according to the present invention mounted on a coordinate measuring machine (CMM)

Referring to the figures, FIG. 1 shows a rotation detection kit 2 according to the present invention, mounted on a coordinate measuring machine (CMM) 4. The rotation detection kit 2 comprises a polarised beam source 6 and a receiver unit 8. The polarised beam source 6 is mounted on a machine table 12 of the CMM 4 via a base unit 10 so that they cannot move relative to each other. The receiver unit 8 is mounted on a quill 18 of the CMM 4 so that they cannot move relative to each other. In the embodiments described, the rotation detection kit 2 is used to determine the relative roll, pitch and yaw between the polarised beam source 6 and the part mounted to the quill 18 about the propagation axis of the beam emitted from the polarised beam source as they move relative to each other along a trajectory.

The polarised beam source 6 and the base unit 10 mounted on the machine table 12 are provided with complementary parts of a kinematic support 14 which enable the polarised beam source 6 to be accurately aligned along any of the X,Y,Z,−X and −Y axes of the CMM or along any other desired direction. Such kinematic supports for aligning optical units are known, such as those disclosed in International Patent Application no. PCT/GB01/03096.

In use, the receiver unit 8 is moved by the quill 18 along a path parallel to the X-axis, and the rotation detection kit 2 is used to detect and measure relative rotation between the polarised beam source 6 and receiver 8 about the X, Y and Z-axes. Accordingly, the amount of rotation about the X, Y and Z-axes between the machine table 12 and the quill 18 can be determined and used to calibrate the CMM 4 as the quill 18 moves along the X-axis. Using the invention, the rotation detection kit can be used to calibrate out roll, pitch and yaw errors using the same beam. This process can then be repeated to calibrate the roll, pitch and yaw errors along the Y and Z axes by orientating the polarised beam source 6 and receiver 8 accordingly, and moving the quill 18 along the Y and Z axes.

In the embodiment described, the rotation detection kit 2 is mounted on a CMM 4 and is used in the calibration of the CMM 4. However, it will be understood that the rotation detection kit 2 need not necessarily be mounted on a CMM, and could be used in many different applications in which it is useful to detect relative rotation between two components. In particular, the rotation detection kit could be used in a tracking system, for instance tracking the movement of a part of a machine to which the receiver unit 8 is mounted (or the analyser 110 as shown in FIG. 6).

Referring now to FIG. 2, there is shown a rotation detection kit configured to measure relative roll, pitch and yaw between the polarised beam source 6 and the receiver unit 8. In the embodiment described, roll is taken as rotation about the propagation axis of the beam emitted by the polarised beam source. Pitch and yaw are taken as rotation about two other axes that are perpendicular to the propagation axis and to each other.

The polarised beam source 6 comprises first 20 and second 22 laser diodes, first 24 and second 26 lenses, a polarising beam splitter 28, a polarising maintaining fibre optic 30, a collimating lens 31, a non-polarising beam splitter 32, a first polariser 34, a servo photo-diode 36, a servo unit 38 and a timer unit 40. All of these components of the polarised beam source 6 are fixed relative to each other.

The first laser diode 20 is configured to emit a first laser beam having a first linear polarisation state and the second laser diode 22 is configured to emit a second laser beam having a second linear polarisation state. As will be understood, the preferred power of the laser beams emitted by the first 20 and second 22 laser diodes will depend on a number of factors, such as the environment in which the rotation detection kit 2 is used. In preferred embodiments the power of the first 20 and second 22 laser beams are less than 1 milliwatt for safety reasons.

The first 20 and second 22 laser diodes are configured such that when their respective laser beams reach the polarising maintaining fibre optic 30 their polarisation states are orthogonal to each other. The first 20 and second 22 laser diodes are laser diodes that are capable of being modulated at a rate of 1MHz.

The first 24 and second 26 lenses are configured to focus the laser beams emitted by the first 20 and second 22 laser diodes onto the polarising maintaining fibre optic 30. The polarising beam splitter 28 is configured to direct the first and second laser beams emitted by the first 20 and second 22 laser diodes into the polarising maintaining fibre optic 30.

The polarising maintaining fibre optic 30 is a singlemode fibre optic that has two polarisation axes. The polarising maintaining fibre optic 30 is configured so that one of its polarisation axes is aligned with the first polarisation state of the first laser beam and so that the other of its polarisation axes is aligned with the second polarisation state of the second laser beam. Accordingly, the polarisation states of first and second laser beams emitted by the first 20 and second 22 laser diodes are maintained as they progress through and emerge from the polarisation maintaining fibre optic 30. The polarising maintaining fibre optic 30 is insulated from vibration, mechanical deformation and thermal changes so as to reduce the influence of external factors on the laser beams it carries.

The non-polarising beam splitter 32 is configured to split a laser beam emerging from the polarising maintaining fibre optic 30 into a servo laser beam which is directed toward the first polariser 34 and an identical receiver laser beam which is directed toward the receiver unit 8.

The first polariser 34 is configured so that its polarisation axis is at a 45 degree angle to both the first and second polarisation states of the servo laser beam.

The servo photo-diode 36 is configured to detect the intensity of light passing through the first polariser 34 and to output the detected intensity to the servo unit 38. The servo unit 38 is configured to control the power of the first 20 and second 22 laser diodes as described in more detail below.

The receiver unit 8 comprises second 41, third 42 and fourth 43 polarisers, corresponding second 44, third 45 and fourth 46 photo-diodes, and corresponding a roll 47, pitch/roll 48 and yaw/roll 49 determinator units. Second 50 and third 52 beamsplitters and reflector 54 are provided such that identical copies of the beam coming into the receiver unit 8 are passed through the second 41, third 42 and fourth 43 polarisers and subsequently onto their corresponding second 44, third 45 and fourth 46 photo-diodes. As will be understood, the second 41, third 42 and fourth 43 polarisers need not be part of the receiver 8. For instance, the second 41, third 42 and third 43 polarisers could be mounted on the quill 18 and the receiver unit 8 could be mounted to another part of the CMM 4.

The second 41, third 42 and fourth 43 polarisers are identical to the first polariser 34. As explained in more detail below, in the particular embodiment described, The second 41, third 42 and fourth 43 polarisers are mounted within the receiver unit 8 such that when the receiver unit 8 and the polarised beam source 6 are initially aligned (i.e. so that there is no roll, pitch or yaw between them) the intensities of the first and second beam portions as detected by their respective photodiode are identical.

As schematically illustrated in FIG. 2, the second 41, third 42 and fourth 43 polarisers are each arranged differently relative to the beam coming into the receiver unit 8. In particular, the second polariser 41 is arranged such that the relative roll between the polarised beam source 6 and receiver unit 8 causes a change in the intensity of the beam falling on the second photodiode 44; the third polariser 42 is arranged such that relative pitching between the polarised beam source 6 and receiver unit 8 causes a change in the intensity of the beam falling on the third photodiode 45; and the fourth polariser 43 is arranged such that relative yawing between the polarised beam source 6 and receiver unit 8 causes a change in the intensity of the beam falling on the fourth photodiode 46.

As shown in FIGS. 5(a) to (c) in more detail, the second polariser's 41 polarisation axis is arranged such that it is normal to the propagation axis of the beam received by the receiver unit 8. In this case, rotation about the "Roll" axis causes a change in the polarising effect it has on the beam. The third polariser 42 is arranged such that its polarisation axis is yawed relative to that of the second polariser device 41. In this case, rotation about the "Pitch" axis causes a change in the polarising effect it has on the beam. The fourth polariser 43 is arranged such that its polarisation axis is pitched relative to that of the second polariser device 41. In this case, rotation about the "Yaw" axis causes a change in the polarising effect it has on the beam. As will be understood, the third 42 and fourth 45 polarisers also cause a change in the polarising effect they have on the beam as they are rotated about the "Roll" axis, and accordingly, they are actually providing a measure of rotation about an axis that is between the roll axis and pitch/yaw axes respectively, as illustrated by Φ in the drawings.

The roll determinator 47, pitch/roll determinator 48 and yaw/roll determinator 49 are configured to analyse the detected intensities of the second 44, third 45 and fourth 46 photodiodes over a period of time and provide an output indicative of the amount of roll, pitch and roll, and yaw and roll respectively between the polarised beam source 6 and the receiver unit 8, as described in more detail below.

The receiver unit 8 is connected to a computer 51 by a communications link 53. In the embodiment described, the communications link is a wireless communications link which utilises the Bluetooth protocol. The computer 51 has a display (not shown) via which a reading indicating the degree of roll, pitch and yaw between the polarised beam source 6 and the receiver unit 8 can be provided to a user.

In use, the servo unit 38 receives a clock signal from the timing unit 40. The servo unit 38 uses the clock signal to alternately power the first 20 and second 22 laser diodes so that they alternately and mutually exclusively emit first 100 and second 102 laser beams at a predetermined frequency. In the embodiment described, the first 20 and second 22 laser diodes are controlled so that the first and second laser beams alternately occur at a frequency of 10 kHz. However, it will be understood that any suitable frequency could be used and will depend on factors such as the components used, environment in which the rotation detection kit is used and the requirements of the rotation detection kit.

The servo unit 38 controls the first 20 and second 22 laser diodes such that there is no time gap between the emission of the first 100 and second 102 laser beams, but so that there is a 2 μS gap between the emission of the second laser beam and the first laser beam. Accordingly, there is a gap between each cycle of first 100 and second 102 laser beams. This gap is used to synchronise the roll 47, pitch/roll 48 and yaw/roll determinators 49 with the cycle of the laser beams as explained in more detail below.

The first 100 and second 102 laser beams emitted from the first 20 and second 22 laser diodes are focussed by the first 24 and second 26 lenses respectively onto the polarising maintaining fibre optic 30, via the polarising beam splitter 28. The combination of the first 24 and second 26 lenses, and the polarising beam splitter 28 helps to ensure that substantially all of the light emitted from the first 20 and second 22 laser diodes is directed into the polarising maintaining fibre optic 30.

The purpose of the polarising maintaining fibre optic 30 is to co-align the paths of the first 100 and second 102 laser beams. What emerges from the polarisation maintaining fibre optic 30 is effectively a resultant laser beam 104 having alternating discrete first and second portions, wherein the first portion corresponds to a first laser beam 100 emitted by the first laser diode 20 and the second portion corresponds to a second laser beam 102 emitted by the second laser diode 22. Accordingly, the polarisation state of the resultant laser beam 104 alternates between two orthogonal polarisation states 10,000 times a second.

The resultant laser beam 104 emerging from the polarisation maintaining fibre optic 30 is collimated by the collimating lens 31 and is then split into identical servo 106 and receiver 108 laser beams by the beam splitter 32.

The first and second portions of the servo laser beam 106 that pass through the first polariser 34 are detected by the servo photo-diode 36, the output of which is fed to the servo unit 38. In response to the detected intensities, the servo unit 38 controls the power of the first 20 and second 22 laser diodes to ensure that the intensity of the first and second portions falling on the servo photo-diode is constant. This helps to compensate for any rotation of the polarisation states of the first 100 and second 102 laser beams caused by factors internal to the polarised beam source 6. Accordingly, this helps to ensure that the receiver determinator units 47, 48, 29 do not output a signal indicative of relative rotation between the polarised beam source 6 and receiver unit 8 due to such rotation of the polarisation states within the polarised beam source 6.

The receiver laser beam 108 arrives at the receiver unit 8 and is split into three identical beams via the second 50 and third 52 non-polarising beam splitters; a first of which is directed toward the second polariser 41, a second of which is directed toward the third polariser 42 and a third of which is directed toward the fourth polariser 43 via the reflector 54. Each of the second 41, third 42 and fourth polarisers 43 resolve the first and second portions of the receiver beam 108 into two orthogonal vector components, one of which is parallel to the polarisation axis ("the parallel component"), and the other of which is perpendicular to the polarisation axis. In the described embodiment, the parallel components of each of the first and second portions of the receiver laser beam 108 pass through the polarisers and their intensities are detected by their respective photo-diode. The second 44, third 45 and fourth 46 photo-diodes output a signal which is indicative of the detected intensities. The output signals of the photo-diode are fed into their respective roll 47, pitch/roll 48 and yaw/roll 49 determinators which analyse the detected intensities and respectively output a signal indicative of the extent of roll, pitch and roll, and yaw and roll between the polarised beam source 6 and the receiver unit 8.

The embodiment described is configured such that when the polarised beam source 6 and the receiver unit 8 are aligned, the intensity of the parallel components of each of the first and second portions of the receiver laser beam 108 received at the second 44, third 45 and fourth 46 photo-diodes will be the same. This is achieved by angling the second 41, third 42 and fourth 43 polarisers such that their polarisation axes resolve the first and second portions of the receiver beam 108 into equal parallel and perpendicular components.

In contrast, when the polarised beam source 6 and the receiver unit 8 are rolled relative to each other, the magnitude of the parallel component of one of the first and second portions of the receiver laser beam 108 reaching the second photo-diode 44 will be greater than the other; when the polarised beam source 6 and the receiver unit 8 are pitched relative to each other, the magnitude of the parallel component of one of the first and second portions of the receiver laser beam 108 reaching the third photo-diode 45 will be greater than the other; and when the polarised beam source 6 and the receiver unit 8 are yawed relative to each other, the magnitude of the parallel component of one of the first and second portions of the receiver laser beam 108 reaching the fourth photo-diode 46 will be greater than the other. This is because, when there is a degree of roll, pitch and/or yaw between the polarised beam source 6 and the receiver unit 8, the polarisation axis of the second, third and fourth polarisers 42 relative to the first and second portions of the receiver laser beam 108 will change and so the parallel component of one of the first and second beam portions will increase and the parallel component of the other beam portion will decrease. In particular, the parallel component of the portion of the receiver laser beam 108 which has a smaller angle between its polarisation state and the polarisation axis will be larger than that of the other portion of the laser beam. Accordingly, the detected intensity of one of the first and second portions of the receiver laser beam detected by the second 41, third 42 and fourth 43 photo-diodes will be greater than the other.

The difference in the detected intensity of the first portion of the receiver laser beam 108 and the detected intensity of the second portion of the receiver laser beam 108 by the second photo diode 44 is dependent on the degree of roll between the polarised beam source 6 and the receiver unit 8. The roll determinator's 47 output which is based on that difference can be used by the computer 51 to determine the amount of roll between the beam source 6 and the receiver unit 8.

The difference in the detected intensity of the first portion of the receiver laser beam 108 and the detected intensity of the second portion of the receiver laser beam 108 by the third photo diode 45 is dependent on the degree of pitch and roll between the polarised beam source 6 and the receiver unit 8. The pitch and roll determinator's 48 output is dependent on this difference. As the computer 51 already knows from the roll determinator's 47 output how much roll there is between the polarised beam source 6 and receiver unit 8, the computer can use the pitch and roll determinator's 48 output in combination with the roll determinator's output to work out how much pitch there is between the beam source 6 and the receiver unit 8.

The difference in the detected intensity of the first portion of the receiver laser beam 108 and the detected intensity of the second portion of the receiver laser beam 108 by the fourth photo diode 46 is dependent on the degree of yaw and roll between the polarised beam source 6 and the receiver unit 8. The yaw and roll determinator's 49 output is dependent on this difference. As the computer 51 already knows from the roll determinator's 47 output how much roll there is between the polarised beam source 6 and receiver unit 8, the computer can use the yaw and roll determinator's 49 output in combination with the roll determinator's output to work out how much yaw there is between the beam source 6 and the receiver unit 8.

Furthermore, as the polarised beam source 6 and receiver unit 8 move along their trajectory, any roll, pitch and yaw between them will cause a change in the detected intensities of the first and second portions of the receiver laser beam 108. Accordingly, roll, pitch and yaw between the polarised beam source 6 and the receiver unit 8 can be actively determined during movement along a trajectory by monitoring for changes in the detected intensities on each of the second 44, third 45 and fourth 46 photo diodes.

As shown in more detail in FIG. 3, each of the roll 47, pitch and roll 48, and yaw and roll 49 determinators comprises a pulse detect unit 56, a timing generation unit 58, a sample and hold unit 60 and a synchronous demodulator 62. The following provides a description of the implementation and workings of the roll determinator 47. However, as will be understood, the implementation and workings of the pitch and roll 48, and yaw and roll 49 determinators are the same. The only difference is that the intensities of the first and second beam portions making up the receiver laser beam 108 as detected by the third 42 and fourth 43 photodiodes are dependent on pitch and roll, and yaw and roll respectively of the polarised beam source 6 and receiver unit 8, and therefore measure different relative rotations.

The output of the second photo-diode 44 is dependent on the intensity of light falling on it. An illustrative example of the output 70 of the second photo-diode 44 over a plurality of cycles of the emission of first 100 and second 102 laser beams is shown in FIG. 4*a*. The "a" sections correspond to the detected intensity of the first portions of the receiver laser beam 108, and the "b" sections correspond to the detected intensity of the second portions of the receiver laser beam 108. The troughs 72 represent the gap between the emission of the second laser beam by the second laser diode 22 and the first laser beam by the first laser diode 20. The peaks 74 represent the spikes in the intensity of the first 100 and second 102 laser beams which are caused by the turning on of the first 20 and second 22 laser diodes.

In this example, the polarised beam source 6 and the receiver unit 8 are rolled by a constant angle over the duration illustrated with reference to FIG. 4. Accordingly, the receiver photo-diode 46 output is consistently higher for the first portions of the resultant laser beam 108 than the second portions. As will be understood, if the polarised beam source 6 and receiver unit 8 were rotating relative to each other, away from their aligned position, then the receiver photo-diode 46 output would be increasingly greater for one of the portions of the resultant laser beam 108 than the other.

The output of the second photo-diode 44 is fed into the pulse detect unit 56 which is triggered by a significant drop in the intensity of light detected by the second photo-diode 44. In the embodiment described, the pulse detect unit 56 is triggered by the gap between the emission of the second 102 and first 100 laser beams. The output of the pulse detect unit 56, which is passed to the timing generation unit 58, is shown in FIG. 4(*b*). The timing generation unit 58 uses the detection of the troughs 72 to calculate when the spikes 74 will occur. The timing generation unit 58 then generates a sample and hold signal 78 which is provided to the sample and hold unit 60. The timing generation unit 58 also generates a demodulator timing signal 82 which is provided to the synchronous demodulator unit 62 as described in more detail below. As shown in FIG. 4(*c*), the sample and hold signal 78 is set to hold during the troughs 72 and spikes 74.

The output 70 of the second photo-diode 44 is also fed into the sample and hold unit 60 which samples the output in accordance with the sample and hold signal 78 so that the troughs 72 and the spikes 74 of the second photo-diode output 70 are not sampled. Accordingly, as shown in FIG. 4(*d*), the output 80 of the sample and hold unit 60 is purely representative of the intensities of the first and second portions of the receiver laser beam 108.

The output 80 of the sample and hold unit 60 is fed into the synchronous demodulator 62 which, using the timing signal 82, outputs a signal 84 indicative of the difference in the intensity of the first and second portions of the receiver laser beam 108 as shown in FIG. 4(*f*). As will be understood, the greater the degree of roll between the polarised beam source 6 and the receiver unit the greater the signal output by the synchronous demodulator.

In order for the synchronous demodulator unit 62 to be able to analyse the output 80 from the sample and hold unit 60 so as to output a signal indicative of the difference in the intensities of the first and second portions of the receiver laser beam 108, it is necessary for the synchronous demodulator unit 62 to know where to look for the step in detected intensity. Accordingly, the timing generation unit 58 uses the triggering of the pulse detection unit 56 to generate a demodulator timing signal 82 (shown in FIG. 4(*e*)) which is fed to the synchronous demodulator unit 62.

The synchronous demodulator unit 62 uses the demodulator timing signal 82 to synchronise itself with the cycle of the first and second portions of the receiver laser beam 108. It therefore knows when it might expect to see a change in the detected intensity due to roll (or pitch or yaw for the other determinator units) and so enables it to find such a change even if the sample and hold output 60 is noisy and not smooth as shown in FIG. 4(*d*). As shown in FIG. 4(*f*) the synchronous demodulator unit 62 provides an output signal 84 which is proportional to the difference in the detected intensities of the first and second portions of the receiver laser beam 108.

The output signal 84 from the synchronous demodulator unit 62 is sent to the computer 51 via the communications link 53. On the basis of the output signal 84, the computer 51 outputs a reading which indicates the degree of roll between the polarised beam source 6 and the receiver unit 8.

As will be understood, if there is no roll between the polarised beam source 6 and the receiver unit 8, then the amplitudes of sections "a" and sections "b" of the photodiode output will be equal, the output of the sample and hold unit 60 will be constant, and accordingly the synchronous demodulator unit 62 output signal 84 will be set at a level which is interpreted by the computer 51 as meaning that there is no roll.

Due to the first and second portions of the receiver laser beam 108 being detected by the same second photo-diode 44, any fluctuations in the condition of the second photo-diode 44 will affect both of the portions in the same way and to the same extent.

Furthermore, as the first and second portions of the receiver laser beam 108 have taken the same path to reach the second photo-diode 44, any dust, dirt or other contamination in the path will affect both of the same in the same way and to the same extent.

Accordingly, the difference in the detected intensity of each of the first and second portions of the receiver laser beam 108 will not change as a result of any such fluctuations in the conditions of the second photo-diode 44 or contamination in the path of the receiver laser beam 108. The synchronous demodulator unit 62 output will therefore not change as a result of such fluctuations or contamination. Accordingly, receiver unit 8 is insensitive to changes in the condition of the second photo-diode 44 and/or the environment in which the rotation detection kit 2 is used, and so provides a reliable indication of roll.

For the embodiment described above to work, the rotation detection kit 2 must be setup so that when the transmitter 6 and receiver 8 are aligned, the intensity of each of the first and second portions of the receiver laser beam 108 detected by the second photo-diode 44 are equal. Accordingly, if (once the transmitter 6 and receiver 8 have been placed on their respective parts of the CMM 4 and are aligned) the detected intensity of each of the first and second portions of the receiver laser beam 108 are not the same, the rotation detection kit 2 needs to be setup so that the detected intensities are the same before the operation described above is performed.

The servo unit 38 can have an input mechanism by which the intensity of each of the laser beams emitted by the first 20 and second 22 laser diodes can be adjusted. In the embodiment described, the servo 38 receives from the receiver unit 8 via a wireless communications link (not shown) a signal which indicates the detected intensity of each of the first and second portions of the receiver laser beam 108. The servo unit 38 then automatically adjusts the power of the laser beams emitted by the first 20 and/or second 22 laser beams until the intensity of each of the first and second portions of the receiver laser beam 108 detected by the second photo-diode 44 are the same. Accordingly, when this is the case, the actual intensity of the first 100 and second 102 laser beams will likely differ, and that difference will be detected by the servo photo-diode 36. In operation, the servo 38 will therefore be configured so as to maintain that difference in the intensity of the first and second portions of the servo laser beam 106 as detected by the servo photo-diode 36.

Referring now to FIG. 6, an alternative embodiment of a rotation detection kit according to the present invention is described. This embodiment is very similar to that described above in connection with FIGS. 1 to 5 above and like parts share like reference numerals. However, in this embodiment the polarised beam source 6 comprises the second 44, third 45 and fourth 46 photodiodes, and an analyser 110 which is mounted onto the moveable quill 18 comprises the second 50 and third 52 beam splitters, second 41, third 42 and fourth 43 polarisers, and five reflectors 54. The polarised beam source 6 and analyser 110 are arranged such that the beam 108 from the polarised beam source 6 is split into three identical beams which pass through the second 41, third 42 and fourth 43 polarisers respectively before being reflected back onto the second 44, third 45 and fourth 46 photodiodes respectively, as shown in the Figure. This has the advantage that electrical power need be provided at one end of the system only. This arrangement is particularly useful in situations in which the kit is to be used part of a tracking system—the analyser 110 can mounted to the component to be tracked and used as a target. The combined polarised beam source/receiver unit 6 can be mounted on an actuator which causes the polarised beam source 6 to follow the analyser 110 on the basis of the outputs of the roll 47, pitch and roll 48, and yaw and roll 49 determinators. Furthermore, instead of or in addition to modulating the first 20 and second 22 laser diodes such that there is a gap between the second and first beam portions, a timing signal for use in synchronously demodulating the output of the second 44, third 45 and fourth 46 photodiodes could be provided to the roll 47, pitch and roll 48, and yaw and roll 49 determinators directly from the timing unit 40 along line 114.

As can be seen in FIG. 6, the axis along which the beam travels as it is incident on the fourth polariser 43 is different to the propagation axis of the beam between the polarised beam source 6 and analyser 110. However, the fourth polariser 43 can still measure yaw by being arranged such that its polarisation axis is angled relative to the beam axis of travel at the point it is incident on the fourth polariser 43 such that relative yaw between the polarised beam source 6 and analyser 110 affects the relative intensities of the beam portions passing through the fourth polariser 43.

Referring now to FIG. 7, another alternative embodiment of a rotation detection kit according to the present invention is described. This embodiment is very similar to that described above in connection with FIGS. 1 to 5 above and like parts share like reference numerals. However, in this embodiment, the receiver unit only comprises a roll determinator 47 and a pitch and roll determinator 48.

Referring now to FIG. 8, another alternative embodiment of a rotation detection kit according to the present invention is described. This embodiment is very similar to that described above in connection with FIGS. 1 to 5 above and like parts share like reference numerals. However, in this embodiment, the receiver unit 8 comprises the third polariser 42 only (which is angled relative to the propagation axis of the receiver laser beam 108) and the pitch and roll determinator 48. In a further alternative embodiment, the receiver unit could comprise the fourth polariser 43 only and a yaw and roll determinator 48. As described above, the pitch and roll determinator 48 (or yaw and roll determinator) actually provides an output which is dependent on relative pitch and roll (or yaw and roll) of the polarised beam source 6 and receiver unit 8, and the pitch (or yaw) value can only be worked out by knowing the relative roll value from a separate roll determinator. However, embodiments in which only a single angled polariser is provided, such as a polariser arranged for measuring pitch and roll, are useful for measuring relative rotation other than roll, when the polarised beam source 6 and receiver unit 8 are constrained from rolling relative to each other. This is because can be assumed that any change in the output from the determinator will be due to relative pitching or yawing (depending on how the polariser is arranged relative to the receiver laser beam 108) and not roll. Likewise, in embodiments in which the polarised beam source 6 and receiver unit 8 are constrained from rolling relative to each other, the receiver unit 8 could comprise just the third 42 and fourth 43 polarisers and the pitch and roll 48, and yaw and roll determinators and the computer 51 could reliably determine from their outputs relative pitching and yawing between the polarised beam source 6 and receiver unit 8.

In a further alternative embodiment, a single photodiode could be provided in the receiver unit 8 instead of two or three. In this case, an alternator device could be provided, such as a motor, which alternates which of the second 41, third 42 and fourth 44 polarisers are located in the path of the receiver laser beam 108. Accordingly, the rotation determinator and/or computer which receives the output from the photodiode has to demodulate the outputs such that it knows which part of the output relates to roll, which part relates to pitch and which part relates to yaw. One way of achieving this is illustrated in FIG. 9, which is similar to that described above in connection with FIGS. 7 and like parts share like reference numerals. However, in this case, rather than providing second 41 and third 42 polarisers, only a second 41 polariser is provided which is mounted on a motor (not shown) which can turn the second polariser 41 back and forth in the direction illustrated by arrow A. Furthermore, a timing unit 39 is provided for controlling the motor, and a demodulator 57 is provided for receiving a timing signal from the timing unit 39 and the output from the angle determinator 55. In use, the timing unit 39 controls the motor such that the second polariser 41 alternates between i) being oriented such that its polarisation axis is normal to the propagation axis of the receiver beam 108, during which time the angle determinator measures rotation about the propagation axis and ii) angled such that the its polarisation axis is not normal to the propagation axis, during which time the angle determinator measures rotation about another axis that is not parallel to the propagation axis. Accordingly, the second polariser 41 alternates between being oriented like the second polariser device 41 is FIG. 7 and the third polariser device 42 in FIG. 7. The demodulator 57 can demodulate the measurements of rotation about the propagation axis and measurement of rotation about an axis that is not parallel to the propagation axis using the timing information from the timing unit 39. These measurements are passed to the computer 51, which in line with the above described embodiments can use the measurement information determine rotation about the propagation axis as well as rotation about an axis that is perpendicular to the propagation axis.

As will be understood, although the embodiments described above utilise temporally spaced beam portions having different polarisation states, this need not necessarily be the case. For instance, the polarised beam source 6 could be configured to emit a beam having a continuously rotating polarisation orientation. In this case, the configuration of the second 41, third 42 and/or fourth 43 polariser devices in the receiver unit 8 will be the same, but as will be understood, the intensity as detected by the second 44, third 45 and fourth 46 photodiodes will continuously vary with time, in a substantially sinusoidal manner. Accordingly, the roll 47, pitch/roll 48 and/or yaw/roll 49 determinators will be configured to determine rotation by looking for a shift in the phase of the intensity signal as detected by its respective beam intensity sensor. The shift in the phase could be determined by looking at the relative phase between the intensity signal and a reference signal which is sent to the receiver unit 8 by the polarised beam source.

FIG. 10 shows a yet further alternative embodiment. This embodiment is similar to that shown in FIG. 8 in that it is configured to measure rotation about only one axis that is non-parallel to the propagation axis. The polarised beam source 6 comprises a single emitter 20, polariser 21 and lens 31 configured such that what is emitted from the polarised beam source 6 is a statically polarised beam 107. The receiver unit 8 comprises a crystal polarising beam splitter 33, similar to a Glan Taylor or Glan Thompson polarising beamsplitter, except that the crystal's optic axis (illustrated by the dashed lines 35) is not aligned in the plane of the beamsplitter's input window, so that the crystal's optic axis is aligned non-perpendicularly to the propagation axis of the statically polarised beam 107. The polariser device therefore resolves the statically polarised beam 107 into first 109 and second 111 orthogonal components, the relative intensity of which is affected by the degree of rotation about a first axis that is perpendicular to the propagation axis. The intensities of the components are detected by first 27 and second 37 photodiodes, the difference between which is amplified by a differential amplifier 113 and output to the computer 51. The computer 51 then uses the output from the differential amplifier to determine the amount of rotation about the first axis.

The invention claimed is:

1. A rotation detection kit, comprising:
    a source for generating at least a first polarised beam emitted along a propagation axis;
    a receiver comprising at least a first beam intensity sensor;
    an analyser, comprising a first polariser device for location in the at least first polarised beam between the source and at least first beam intensity sensor,
    in which the first polariser device and receiver are configured such that the receiver uses the at least first beam intensity sensor's output in the measurement of rotational movement other than roll between the source and the analyser about a first axis that is nonparallel to the propagation axis.

2. A rotation detection kit as claimed in claim 1, in which the receiver is configured to determine rotational movement between the source and analyser about an axis that is substantially perpendicular to the propagation axis based on the determined relative rotation about the first axis.

3. A rotation detection kit as claimed in claim 1, the analyser comprising a second polariser device for location in the at least first polarised beam between the source and at least first beam intensity sensor independently from the first polariser, and configured such that the receiver measures relative rotation between the source and analyser about a second axis that is different to the first axis.

4. A rotation detection kit as claimed in claim 3, further comprising a second beam intensity sensor for detecting the intensity of the polarised beam subsequent to the second polariser device.

5. A rotation detection kit as claimed in claim 3, in which the receiver is configured to determine rotational movement between the source and analyser about two orthogonal axes based on the determined relative rotation about the first and second axes.

6. A rotation detection kit as claimed in claim 5, in which the receiver is configured to determine rotational movement between the source and analyser about an axis that is parallel to the propagation axis and an axis that is perpendicular to the propagation axis based on the determined relative rotation about the first and second axes.

7. A rotation detection kit as claimed in claim 3, the analyzer comprising a third polariser device for location in the at least first polarised beam between the source and at least first beam intensity sensor independently from the first and second polarisers, and configured such that the receiver measures relative rotation between the source and analyser about a third axis that is different to the first and second axes.

8. A rotation detection kit as claimed in claim 7, in which the receiver is configured to determine rotational movement between the source and analyser about three orthogonal axes based on the determined relative rotation about the first, second and third axes.

9. A rotation detection kit as claimed in claim 3, in which the second axis is parallel to the propagation axis.

10. A rotation detection kit as claimed in claim 1 further comprising:
    a modulator configured to modulate at least one of i) the source and ii) a polarised beam emitted by the source to create a discretely varying polarisation orientation thereby defining first and at least second temporally spaced beam portions, which are resolved by the polariser device and fall on the at least first beam intensity sensor sequentially,
    in which the receiver is configured to measure rotation based on the intensities of the at least first and second temporally spaced beam portions detected by the at least first beam intensity sensor.

11. A rotation detection kit, comprising:
    a source for generating at least a first polarised beam emitted along a propagation axis;
    a receiver comprising at least a first beam intensity sensor;
    an analyser, comprising a first polariser device for location in the at least first polarised beam between the source and at least first beam intensity sensor,
    in which the first polariser device is configured such that the receiver can measure rotation between the source and the analyser about a first axis, in which the angle between the propagation axis and the first axis is at least 15°.

12. A rotation detection kit, comprising:

a source for generating at least a first polarised beam;

a receiver comprising at least a first beam intensity sensor;

an analyser, comprising a first and second polariser devices for independent location in the at least first polarised beam between the source and at least first beam intensity sensor, in which the first polariser device is configured such that the receiver can measure rotation between the source and the analyser about a first axis that is nonparallel to the propagation axis based on the at least first beam intensity sensor's output, and in which the second polarizer device is configured such that the receiver can measure relative rotation between the source and analyser about a second axis that is different to the first axis.

13. A rotation detection kit as claimed in claim 12, in which the receiver is configured to determine rotational movement between the source and analyser about two orthogonal axes based on the determined relative rotation about the first and second axes.

14. A method of measuring rotation, comprising:

taking a source for generating at least a first polarized beam emitted along a propagation axis;

taking a receiver comprising at least a first beam intensity sensor;

taking an analyzer, comprising at least a first polarizer device and locating it in the at least first polarized beam between the source and at least first beam intensity sensor, in which the at least first polarizer device is configured such that the receiver measures rotation between the source and the analyzer about at least a first axis that is non-parallel to the propagation axis based on the at least first beam intensity sensor's output, and using the receiver's measurement output as a measure of relative rotation between the source and analyzer about an axis that is non-parallel to the propagation axis.

* * * * *